(12) United States Patent
Hueber et al.

(10) Patent No.: US 10,192,081 B2
(45) Date of Patent: Jan. 29, 2019

(54) INTERFACE BETWEEN NEAR FIELD COMMUNICATIONS (NFC) CONTROLLER AND SECURE ELEMENT

(71) Applicant: NXP B.V., Eindhoven (NL)

(72) Inventors: Gernot Hueber, Linz (AT); Ian Thomas Macnamara, Graz (AT); Ulrich Neffe, Albersdorf-Prebuch (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/637,111

(22) Filed: Jun. 29, 2017

(65) Prior Publication Data

US 2019/0005284 A1    Jan. 3, 2019

(51) Int. Cl.
| | |
|---|---|
| *H04B 5/00* | (2006.01) |
| *G06K 7/10* | (2006.01) |
| *H04L 12/933* | (2013.01) |
| *H04L 29/06* | (2006.01) |
| *H04W 4/80* | (2018.01) |

(52) U.S. Cl.
CPC ....... *G06K 7/10237* (2013.01); *H04B 5/0031* (2013.01); *H04B 5/0056* (2013.01); *H04L 49/102* (2013.01); *H04L 63/0492* (2013.01); *H04W 4/80* (2018.02)

(58) Field of Classification Search
CPC ...... H04W 4/008; H04W 4/80; H04B 5/0056; H04B 5/0031; H04L 63/0492; H04L 49/102; G06K 7/10237
USPC ........................................................ 455/41.1
See application file for complete search history.

(56) References Cited

U.S. PATENT DOCUMENTS

| | | |
|---|---|---|
| 8,351,854 B2 | 1/2013 | Moosavi |
| 8,811,896 B2 | 8/2014 | Katz et al. |
| 9,087,227 B2 | 7/2015 | Kulkarni |
| 9,224,013 B2 | 12/2015 | Buer et al. |
| 2008/0121687 A1 | 5/2008 | Sklovsky et al. |
| 2009/0103732 A1 | 4/2009 | Benteo et al. |
| 2009/0247077 A1 | 10/2009 | Sklovsky et al. |
| 2014/0022060 A1* | 1/2014 | Boehler .............. H04L 63/0492 340/10.51 |
| 2014/0156872 A1 | 6/2014 | Buer et al. |
| 2014/0233732 A1 | 8/2014 | Buer et al. |
| 2014/0344945 A1 | 11/2014 | Buer et al. |
| 2015/0319273 A1 | 11/2015 | Trost |
| 2016/0099752 A1 | 4/2016 | Lee et al. |

(Continued)

FOREIGN PATENT DOCUMENTS

EP    2 738 671 A1    6/2014

OTHER PUBLICATIONS

Smart Cards; UICC—Terminal interface; Physical and Logical characteristics (Release 12); ETSI TS 102 221 v12.0.0 (Dec. 2014); 64 pages.

(Continued)

*Primary Examiner* — Eugene Yun

(57) ABSTRACT

Embodiments of an interface system for interfacing between an NFC controller and a secure element are disclosed. In one embodiment, an interface system includes an interface memory, an interface controller, an NFC controller interface configured to exchange data between the interface system and an NFC controller, and a secure element interface configured to exchange data between the interface system and a secure element.

20 Claims, 8 Drawing Sheets

(56) References Cited

U.S. PATENT DOCUMENTS

2016/0309285 A1    10/2016  Charles
2017/0142159 A1*   5/2017   Li ........................... H04L 63/20

OTHER PUBLICATIONS

Smart Cards; UICC—Contactless Front-end (CLF) Interface; Part 1: Physical and data link layer characteristics (Release 11); ETSI TS 102 613 v11.0.0 (Sep. 2012); 57 pages.

Smart Cards; UICC—Contactless Front-end (CLF) Interface; Host Controller Interface (HCI) (Release 12); ETSI TS 102 622 v12.1.0 (Oct. 2014); 64 pages.

Near Field Communication Wired Interface (NFC-WI), ECMA-373, 1st Edition / Jun. 2006; 25 pages.

Extended European Search Report for Patent Appln. No. 18176116.4 (dated Nov. 7, 2018).

* cited by examiner

INTERFACE BETWEEN NEAR FIELD COMMUNICATIONS (NFC) CONTROLLER AND SECURE ELEMENT

Embodiments of the invention relate generally to an interface between a near field communications (NFC) controller and a secure element.

In many applications, such as mobile phones, an NFC controller acts as a proxy for communications between a host processor, a secure element, and a contactless front-end. Typically, the interface between the NFC controller and the secure element is either a serial interface that uses the single wire protocol (SWP) or a dual wire interface that operates according to the NFC-wired interface (NFC-WI) protocol or the dual wire protocol (DWP). Although such conventional interfaces support the exchange of data between an NFC controller and a secure element, the interfaces can contribute to undesirable latency and errors.

SUMMARY

Embodiments of an interface system for interfacing between an NFC controller and a secure element are disclosed. In one embodiment, an interface system includes an interface memory, an interface controller, an NFC controller interface configured to exchange data between the interface system and an NFC controller, and a secure element interface configured to exchange data between the interface system and a secure element.

In an embodiment, the NFC controller interface includes a parallel bus interface and the secure element interface includes a parallel bus interface. In a further embodiment, the parallel bus interface of the NFC controller interface is at least 8-bits wide and wherein the parallel bus of the secure element interface is at least 8-bits wide.

In an embodiment, the interface memory is a shared memory.

In an embodiment, the interface memory is a first-in first-out (FIFO) memory.

In an embodiment, the interface memory is a random access memory (RAM) with buffer handling.

In an embodiment, the interface memory is a random access memory (RAM) that includes multiple buffers. In an embodiment, the interface controller is a configured to implement traffic prioritization. In an embodiment, the interface controller is a configured to implement traffic pipelining. In an embodiment, the interface controller is a configured to implement multiple logical data channels.

In an embodiment, a secure element integrated circuit (IC) includes the interface system.

In an embodiment, a near field communications (NFC) controller integrated circuit (IC) includes the interface system.

In another embodiment, an interface system includes an interface memory, an interface controller, an NFC controller interface comprising a data bus interface, an address bus interface, and control bus interface, wherein the data bus interface is a parallel interface, and a secure element interface comprising a data bus interface, an address bus interface, and control bus interface, wherein the secure element data interface is a parallel interface.

In an embodiment, the data bus interface of the NFC controller interface is at least 8-bits wide and wherein the data bus of the secure element interface is at least 8-bits wide.

In an embodiment, the interface memory is a shared memory.

In an embodiment, the interface memory is a FIFO memory.

In an embodiment, the interface memory is a RAM with buffer handling.

In an embodiment, the interface memory is a RAM that includes multiple buffers.

In another embodiment, a method for communicating data between an NFC controller and a secure element is disclosed. The method involves receiving data at a secure element interface of an interface system, passing the data from the secure element interface to an interface memory of the interface system, passing the data from the interface memory to an NFC controller interface of the interface system, and passing the data from the NFC controller interface of the interface system to the NFC controller.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
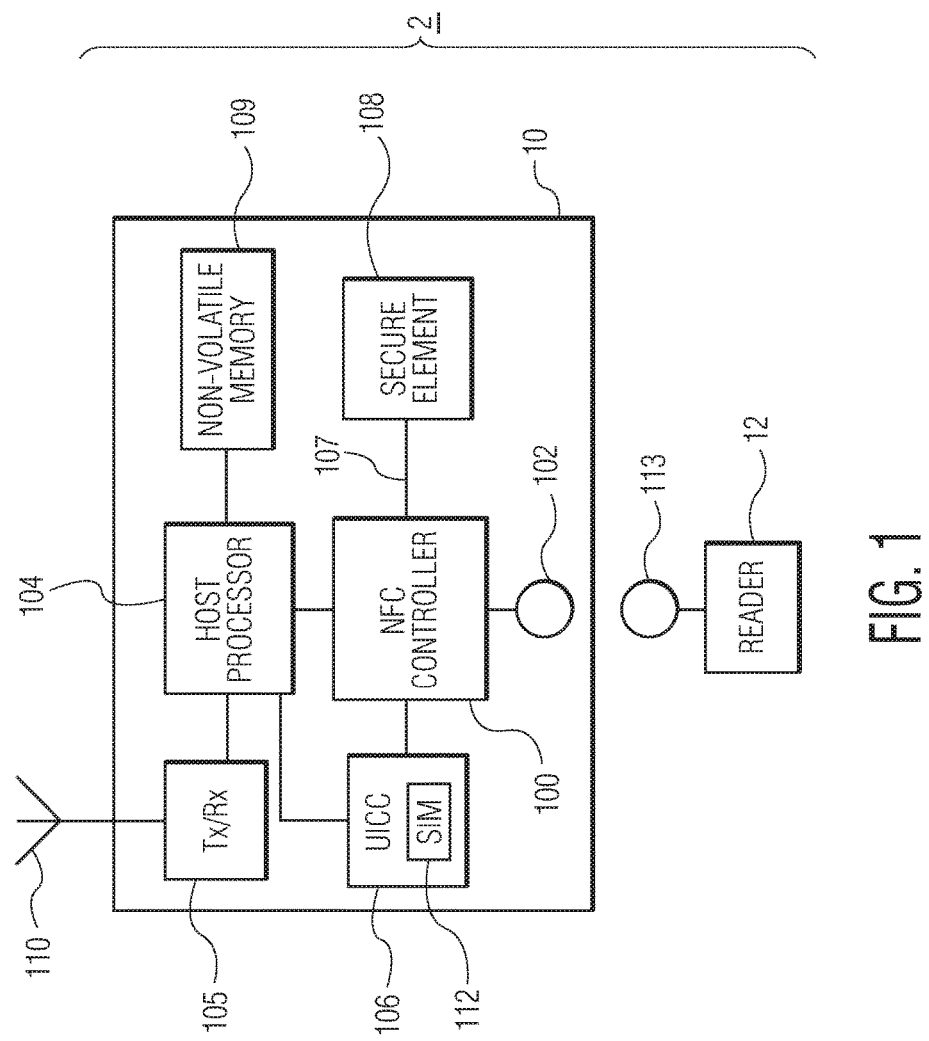
FIG. 1 is a schematic block diagram of a mobile device that includes a host processor, an NFC controller, and a secure element.

FIG. 1 depicts a communications system 2 that includes a mobile communication device 10 and a reader 12, which communicate with each other via, for example, NFC. For example, the mobile communication device and the reader communicate via the NFC communications standard as defined by the International Organization for Standardization (ISO) and the International Electrotechnical Commission (IEC) 14443 standard. The mobile communication device 10 is configured to operate both as a terminal of a mobile telecommunications network (not shown), e.g., as a mobile telephone, and as a device in local bi-lateral NFC communication with the reader 12. In an embodiment, the mobile communication device is a wireless computing device such as a smartphone, a tablet computer, a pad computer, a wearable computer (e.g., a smartwatch), or a laptop computer.

As depicted in FIG. 1, the mobile communication device 10 includes an NFC controller 100, an NFC antenna 102, a host processor 104, a mobile telecommunications transceiver 105, a Universal Integrated Circuit Card (UICC) 106, a secure element 108, and a non-volatile memory 109. The NFC antenna 102 is coupled to the NFC controller 100 and the NFC controller has interfaces coupled to the host processor 104, to the UICC 106, and to the secure element 108. The host processor 104 is a processor such as a central processing unit (CPU) that provides microinstruction and data processing capability for the execution of software-based applications in the mobile communication device. The host processor may include a multifunction processor and/or an application-specific processor. Examples of the host processor include the ATOM family of processors by INTEL, and the Ax family of processors from APPLE, and Advanced RISC Machine (ARM) based processors.

In the illustrated embodiment of FIG. 1, the host processor 104 is functionally coupled to the non-volatile memory 109, to the UICC 106, and to the mobile telecommunications transceiver 105 as is known in the field of smartphones. In an embodiment, the host processor and the NFC controller communicate via Universal Asynchronous Receiver/Transmitter (UART), Serial Peripheral Interface (SPI), and/or Inter-Integrated Circuit (I2C) interfaces. The mobile telecommunications transceiver 105 is coupled to an antenna 110 for communication with a base station (not shown) that may communicate via known wireless protocols such as, without limitation, Global System for Mobile communications (GSM), Universal Mobile Telecommunications System (UMTS), Code Division Multiple Access (CDMA), Worldwide Interoperability for Microwave Access (WiMax) and communications protocols as defined by the $3^{rd}$ Generation Partnership Project (3GPP) or the $3^{rd}$ Generation Partnership Project 2 (3GPP2), 4G Long Term Evolution (LTE), IEEE 802.16 standards bodies, and WiFi. Although some wireless communications protocols are identified herein, it should be understood that present disclosure is not limited to the cited wireless communications protocols. Typically, the UICC enables access to a wireless communications network of a wireless service provider, for example, a wireless communications network operated by a single wireless service provider, such as, for example, AT&T, VERIZON, T-MOBILE, SPRINT, VODAPHONE, ORANGE.

As is known in the field of NFC, a secure element is a module that includes embedded security functionality. For example, a secure element (sometime referred to as an "SE") includes embedded technologies, including hardware, software, and/or firmware, that protect assets such as data, security keys, and applications, from physical and/or software attacks. A secure element may be embodied as a smart card, an application processor, an SD card, a USB token, secure memory devices (e.g., flash or EEPROM), and UICCs. In an embodiment, a secure element includes a crypto-engine that is able to implement a cryptographic algorithm, such as an Advanced Encryption Standard (AES) algorithm. In an embodiment, the secure element is "secure" in the sense that the secure element is a highly tamper resistant device that provides a secure execution environment isolated from the host processor. In an embodiment, the secure element is tamper resistant in that the element can resist software and hardware attacks, either remotely or locally, e.g., the secure element is resistant against side channel analysis. In an embodiment, a secure element is a stand-alone IC device and in other embodiments the secure element is integrated on an IC with other functional elements or the secure element is a stand-alone IC packaged together with another IC, such as the NFC controller 100. In the embodiment of FIG. 1, the secure element is a stand-alone IC device that includes flash and/or EEPROM memory although in other embodiments, the secure element may be packaged together with the NFC controller 100.

In an embodiment, the UICC 106 includes a subscriber identity/identification module (SIM) 112 that stores subscriber identity information that is used to identify and authenticate the subscriber that uses the wireless service provider network. In an embodiment, the UICC is a secure element as is known in the field of NFC. The integrated use of NFC and a UICC is defined by the European Telecommunications Standards Institute (ETSI). For example, ETSI has published the standards:

ETSI TS 102 622, Smart Cards; UICC—Contactless Front-end (CLF) interface; Host Controller Interface (HCI); and ETSI TS 102 613, Smart Cards; UICC—Contactless Front-end (CLF) Interface; Part 1: Physical and data link layer characteristics.

The reader 12 includes a coil 113 to generate a local RF electromagnetic field to interrogate a device, such as the mobile communication device 10, in its near field. The reader may be used in a smart card reader, for example, where the mobile communication device 10 acts as a smart card. In another embodiment, the reader 12 is part of another device, such as another smartphone with an NFC interface, a peripheral connected to a payment system, or a peripheral of a computer.

In an embodiment, the NFC controller 100 of the mobile communication device 10 can be configured for use in a battery-less operation mode of the device, e.g., operation wherein the NFC controller receives at least part of its power supply from an electromagnetic field provided by the reader 12 instead of from a battery of the mobile communication device. Interrogation by the reader 12 may be used to exchange messages with the NFC controller 100. Such messages may be used, for example, in access control, with the mobile communication device 10 acting as an electronic key, or to perform electronic payments, with the mobile communication device 10 acting like a debit card, or to share information. The NFC controller 100 may execute a transaction involving communication with the reader 12, which may include exchanging messages using the NFC antenna 102, for example, to read and/or write data from/to the secure element 108. In an embodiment, the NFC controller includes a CPU, ROM, RAM, EEPROM, and I/O interfaces. An example of the NFC controller is the NFC controller, PN544 or PN547, by NXP SEMICONDUCTORS.

As shown in FIG. 1, the NFC controller 100 is connected to the secure element 108 by a bus 107. In many conventional systems, the NFC controller is connected to the secure element by a serial interface that operates according to the Single Wire Protocol (SWP). The SWP is a specification, managed by the European Telecommunications Standards Institute (ETSI), for a single-wire connection between a secure element, a UICC/SIM, and an NFC IC, typically within a mobile telephone, such as a smartphone. According to SWP, an NFC IC is configured to transmit information onto the wire by driving voltages 0V and 1.8V, while the secure element IC transmits information onto the wire by sinking 0 mA or 1 mA current, whenever there is 1.8V on the wire. Unfortunately, 1 mA can be a significant portion of the NFC IC's current budget in a low-power mode. In addition, SWP transmission rates are limited to 1.7 Mbps.

A low-power alternative to SWP uses an extra wire. This extra wire produces a two wire protocol that is referred to herein as the Dual Wire Protocol (DWP). At the expense of one extra wire, DWP can reduce the NFC IC's current requirement to almost zero, while enabling higher transmission rates (e.g., quadruple or higher) as compared to SWP.

Another two wire protocol used to connect an NFC IC and a secure element is known as the NFC Wired Interface (NFC-WI), which is described by the European Computer Manufacturers Association (ECMA) in specification ECMA-373. NFC-WI uses two wires, SIGIN (signal-in) and SIGOUT (signal-out), and has three modes of operation: off, wired, and virtual mode. In off mode, there is no communication with the secure element. In wired mode, the secure element is visible to the NFC IC and in virtual mode, the secure element is visible to external RF readers.

Some disadvantages of using SWP to connect the NFC controller 100 and the secure element 108 are the need to serialize the payload and the need to encapsulate the data according to ETSI-Host Controller Interface (HCI) specification. Such operations can add latency to data transfers between the NFC controller and the secure element. Additionally, there is an overhead cost to software layers that are responsible for the encapsulation of data for use with SWP, NFC-WI, or DWP. Further, the operations required to implement SWP, NFC-WI, or DWP are vulnerable to errors that may cause communications problems.

In accordance with an embodiment of the invention, an interface system for interfacing between an NFC controller and a secure element is disclosed. In an embodiment, the interface system includes an interface memory, an interface controller, an NFC controller interface configured to exchange data between the interface system and an NFC controller, and a secure element interface configured to exchange data between the interface system and a secure element. In an embodiment, the interface system is configured to support parallel data communications (e.g., 8-bits wide) between the interface system and the NFC controller and between the interface system and the secure element. In an embodiment, the interface memory is a shared memory. Using such an interface system between an NFC controller and a secure element enables data to be communicated between the NFC controller and the secure element at higher data rates and with more flexibility than with the conventional interfaces.

Figure 2:
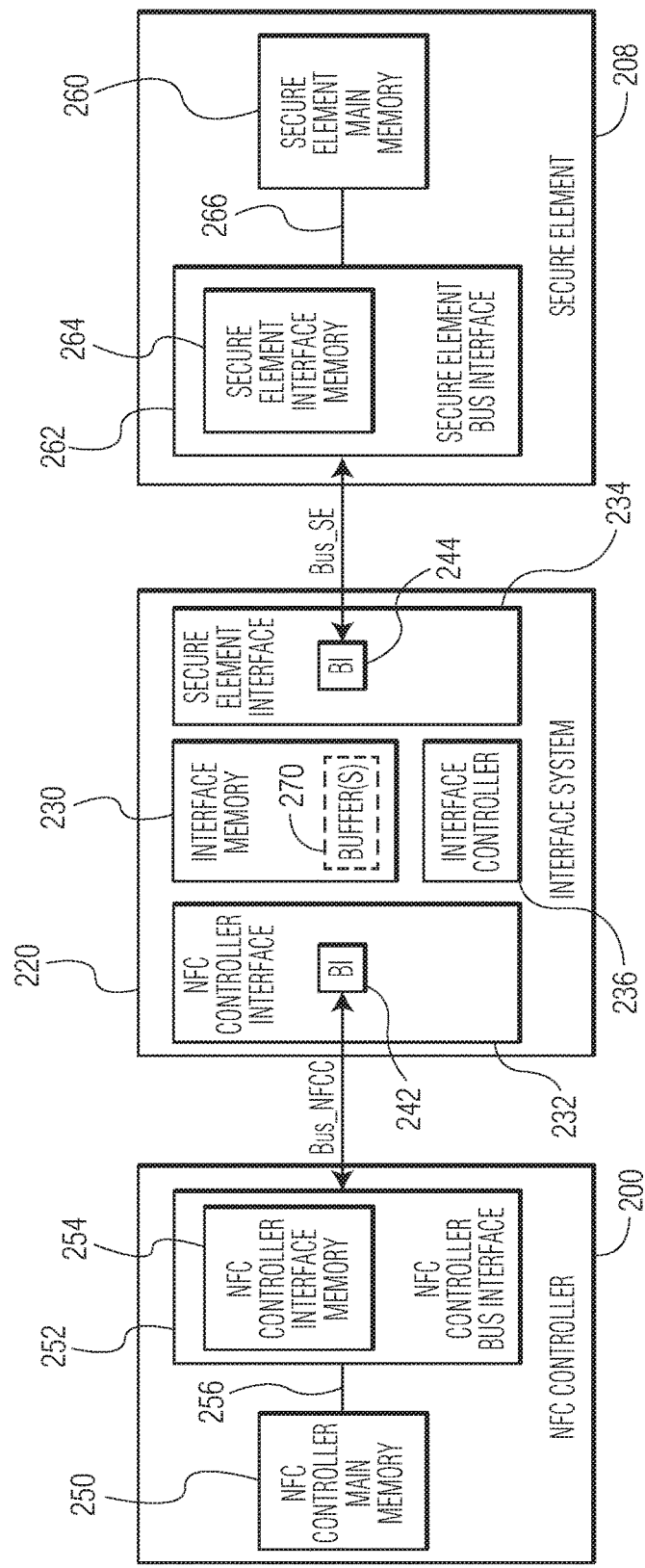
FIG. 2 depicts an embodiment of an interface system that connects an NFC controller to a secure element.

FIG. 2 depicts an embodiment of an interface system 220 that connects an NFC controller 200 to a secure element 208. The interface system can be used to connect the NFC controller 100 and the secure element 108 in the mobile communication device 10 as shown in FIG. 1. In the embodiment of FIG. 2, the interface system 220 includes an interface memory 230, an NFC controller interface 232, a secure element interface 234, and an interface controller 236.

The interface memory 230 of the interface system 220 may be random access memory (RAM). Other types of memory, e.g., Flash, Phase Change Memory, static RAM (SRAM), and non-volatile RAM (NV-RAM) may be used for the interface memory. The memory may be implemented as, for example, a shared memory, a first-in first-out (FIFO) memory, a dual-ported RAM. In an embodiment, the interface memory is able to store, for example, 256 bytes, 500 bytes, or 1 kbytes, and/or the size of the interface memory may be a multiple of a message size that is used to communicate between the NFC controller 200 and the secure element 208.

The NFC controller interface 232 of the interface system 220 provides an interface between the bus, Bus_NFCC, on the NFC controller side of the interface system and the interface memory 230. The NFC controller interface includes circuits such as, for example, converters, comparators, flip-flops, inverters, multiplexers, switches, latches, and/or registers that capture and manage the signals on the bus lines. The NFC controller interface also includes a bus interface (BI) 242 that provides a physical interface to the bus, Bus_NFCC. The bus, Bus_NFCC, may be a serial bus or a parallel bus. In the case of a parallel bus, the bus may include multiple bus lines for data (e.g., 8-bit, 16-bit, 32-bit parallel data lines), a bus line or bus lines for memory address information, a bus line or bus lines for control information, and/or a bus line or bus lines for clock information. Examples of different configurations of the bus, Bus_NFCC, are described below. In an embodiment where the bus, Bus_NFCC, connects two different ICs (e.g., see FIG. 4), the bus interface 242 may include conductive pads/pins that provide a conductive connection point for each line of the bus. In an embodiment where the bus, Bus_NFCC, connects components within the same IC (e.g., see FIG. 5), the bus interface may include conductive paths in a silicon die that connect to functional circuit elements in the die.

The secure element interface 234 of the interface system 220 provides an interface between the bus, Bus_SE, on the secure element side of the interface system and the interface memory 230. The secure element controller interface includes circuits such as, for example, converters, comparators, flip-flops, inverters, multiplexers, switches, latches, and/or registers that capture and manage the signals on the bus lines. The secure element interface also includes a bus interface (BI) 244 that provides a physical interface to the bus, Bus_SE. The bus, Bus_SE, may be a serial bus or a parallel bus. In the case of a parallel bus, the bus may include multiple bus lines for data (e.g., 8-bit, 16-bit, 32-bit parallel data lines), a bus line or bus lines for memory address information, a bus line or bus lines for control information, and/or a bus line or bus lines for clock information. Examples of different configurations of the bus, Bus_SE, are described below. In an embodiment where the bus, Bus_SE, connects two different ICs (e.g., see FIG. 5), the bus interface may include conductive pads/pins that provide a conductive connection point for each line of the bus. In an embodiment where the bus, Bus_SE, connects components within the same IC (e.g., see FIG. 4), the bus interface may include conductive paths in a silicon die that connect to functional circuit elements in the die.

The interface controller 236 of the interface system 220 manages the exchange of data within the interface system and/or between the NFC controller 230 and the secure element 208. Example operations implemented by the interface controller include managing hardware handshakes, managing interrupts, implementing a wake-up in either direction (e.g., wake-up of the NFC controller, wake-up of the secure element, or wake-up of the interface system), buffer management (e.g., buffer availability, watermark level management, control to clear buffers, etc).

The NFC controller 200 connects to the interface system 220 via the bus, Bus_NFCC, and includes an NFC controller main memory 250 and an NFC controller bus interface 252. The NFC controller bus interface provides an interface to the bus, Bus_NFCC, which may include internal conductive connections or external conductive connections (e.g., conductive pads or landings) depending on the type of bus (e.g., internal or external) that is between the NFC controller and the interface system. The NFC controller bus interface includes an NFC controller interface memory 254 that provides a memory (e.g., RAM) that is separated from the NFC controller main memory 250 by an internal bus 256. The NFC controller interface memory insulates the NFC controller main memory from the bus, Bus_NFCC.

The secure element 208 connects to the interface system 220 via the bus, Bus_SE, and includes the secure element main memory 260 and a secure element bus interface 262. The secure element bus interface provides an interface to the bus, Bus_SE, which may include internal conductive connections or external conductive connections (e.g., conductive pads or landings) depending on the type of bus (e.g., internal or external) that is between the secure element and the interface system. The secure element bus interface includes a secure element interface memory 264 that provides a memory (e.g., RAM) that is separated from the secure element main memory by an internal bus 266. The secure element interface memory insulates the secure element main memory from the bus, Bus_SE.

In operation, the interface system 220 manages communications between the NFC controller 200 and the secure element 208. For example, a communication of data from the NFC controller to the secure element passes over the bus, Bus_NFCC, to and through the interface system and then over the bus, Bus_SE, to the secure element. When passing through the interface system, the data is received at the NFC controller interface 232, passed to the interface memory 230, passed to the secure element interface 234, and then transmitted to the secure element. Various different techniques can be applied to manage the data that passes through the interface system. For example, various techniques of data flow management can be applied to the data. In an embodiment, the interface memory of the interface system is implemented as dual-ported RAM or as single ported RAM. Additionally, the RAM can include a buffer or buffers 270 that are managed to avoid collisions on the buses. For example, buffers can be managed using a priority scheme such as a round-robin or weighted round-robin scheme that is implemented by the interface controller 236. In another embodiment, multiple buffers are allocated in the interface memory for communications in one or both directions. Providing multiple buffers enables the implementation of priority-based handling of traffic between the NFC controller and the secure element. In an embodiment, multiple buffers in the interface memory are used to implement data pipelining to speed up the data transfer rate, e.g., for long data transfer sequences. In another embodiment, multiple parallel buffers are implemented in the interface memory to enable handling of multiple logical data channels, which enables traffic isolation, fine granular traffic management, and/or traffic prioritization.

The interface system 220 as shown in FIG. 2 can be implemented in different ways. For example, the interface system can be implemented as a standalone IC or as is described in more detail below, the interface system may be integrated with the NFC controller on an NFC controller IC, or the interface system may be integrated with the secure element on a secure element IC. Integrating the interface system on an NFC controller IC or on a secure element IC reduces the number of different physical parts and allows for the use of the internal bus system (e.g., Advanced High-performance Bus (AHB) or Advanced Peripheral Bus (APB)) of the respective IC, which can be an efficient use of on-chip resources. Additionally, the interface system may be integrated together with the NFC controller and the secure element on a single IC or packaged together into a multi-IC device. Various examples of the interface system are described below with reference to FIGS. 3-7.

Figure 3:
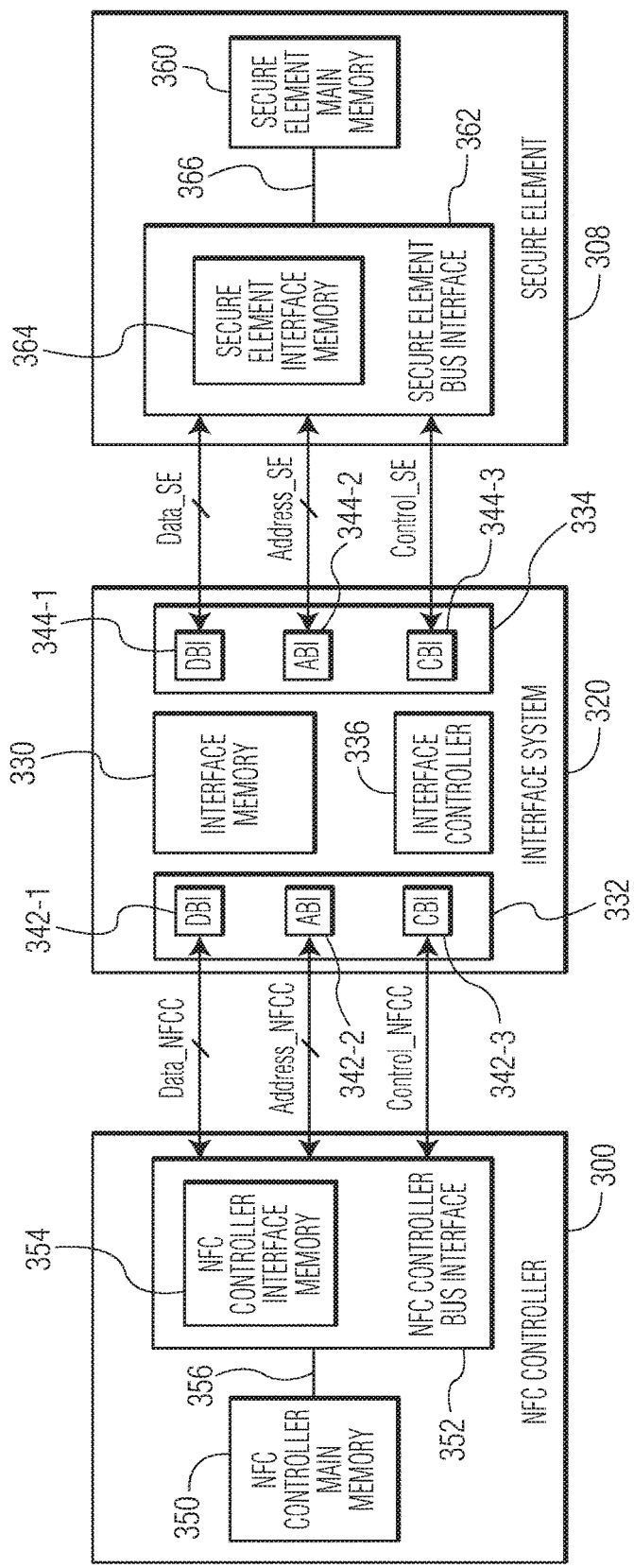
FIG. 3 depicts an embodiment of the interface system of FIG. 2 in which the NFC controller side bus and the secure element side bus each include a data bus, an address bus, and a control bus.

FIG. 3 depicts an embodiment of an interface system 320 that is similar to the interface system 220 of FIG. 2 in which the NFC controller side bus and the secure element side bus both include a data bus, an address bus, and a control bus. In particular, on the NFC controller side, the bus includes a data bus, Data_NFCC, an address bus, Address_NFCC, and a control bus, Control_NFCC, and on the secure element side, the bus includes a data bus, Data_SE, an address bus, Address_SE, and a control bus, Control_SE. The NFC controller interface 332 of the interface system includes a data bus interface (DBI) 342-1 that is configured to support the data bus, Data_NFCC, an address bus interface (ABI) 342-2 that is configured to support the address bus, Address_NFCC, and a control bus interface (CBI) 342-3 that is configured to support the control bus, Control_NFCC. The secure element interface of the interface system includes a data bus interface (DBI) 344-1 that is configured to support the data bus, Data_SE, an address bus interface (ABI) 344-2 that is configured to support the address bus, Address_SE, and a control bus interface (CBI) 344-3 that is configured to support the control bus, Control_SE. The bus interface interfaces (DBI, ABI, and CBI) may include conductive pads/pins that provide a conductive connection point for each line of the bus for an external bus and may include conductive paths in a silicon die that connect to functional circuit elements in the die for an external bus.

With reference to the NFC controller side, the data bus, Data_NFCC, is a parallel bus (e.g., 8-bits, 16-bits, or 32-bits wide) that is used to carry data (e.g., the payload) between the NFC controller 300 and the interface system 320. For example, the data may be the payload data that is being transferred between the NFC controller and the secure element 308. In an embodiment, the width of the data bus, Data_NFCC, matches a bit width of another bus within the mobile communications device 10 and/or matches a higher-level communications protocol used in the mobile communications device.

The address bus, Address_NFCC, is a parallel bus that is used to carry address information although the address bus could be a serial bus. For example, the address information may include the memory addresses associated with the payload data. In an embodiment, the width of a parallel address bus depends on the memory depth and memory size. For example, the interface memory may be on the order of 1 kbytes organized in a width of 1, 2, or 4 bytes, which may be served by a parallel address bus having an 8-bit width.

The control bus, Control_NFCC, is a serial bus that is used to carry control information. For example, the control information may include control information such as an Interrupt Request (IRQ) and status information regarding data status (e.g., a "DataReady" signal), wake up status (e.g., a "WakeUp" signal), buffer status (e.g., "BufferStatus," BufferOverflow," and/or "WatermarkLevel" signals).

With reference to the secure element side, the data bus, Data_SE, is a parallel bus (e.g., 8-bits, 16-bits, or 32-bits wide) that is used to carry data (e.g., the payload) between the secure element 308 and the interface system 320. For example, the data may be the payload data that is being transferred between NFC controller 300 and the secure element 308. In an embodiment, the width of the data bus, Data_SE, matches a bit width of another bus within the mobile communications device 10 and/or matches a higher-level communications protocol used in the mobile communications device. In an embodiment, the width of the data bus, Data_NFCC, matches the width of the data bus, Data_SE.

The address bus, Address_SE, is a parallel bus that is used to carry address information although the address bus could be a serial bus. For example, the address information may include the memory addresses associated with the payload data. In an embodiment, the width of a parallel address bus depends on the memory depth and memory size. For example, the interface memory may be on the order of 1 kbytes organized in a width of 1, 2, or 4 bytes, which may be served by a parallel address bus having an 8-bit width.

The control bus, Control_SE, is a serial bus that is used to carry control information. For example, the control information may include control information such as an Interrupt Request (IRQ) and status information regarding data status (e.g., a "DataReady" signal), wake up status (e.g., a "WakeUp" signal), buffer status (e.g., "BufferStatus," BufferOverflow," and/or "WatermarkLevel" signals).

Figure 4:
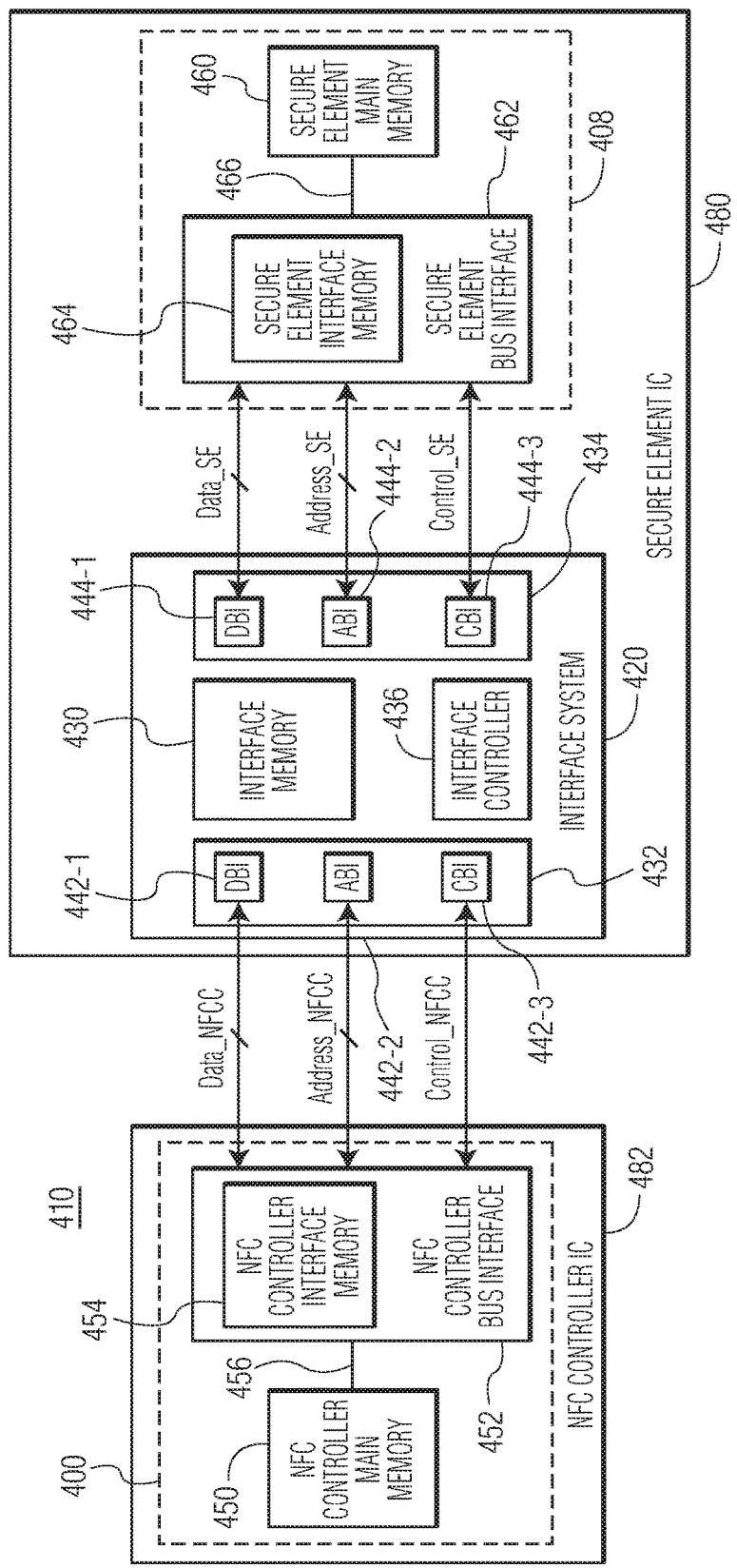
FIG. 4 depicts an embodiment of an interface system that is integrated with a secure element onto a secure element IC.

In some case, it may be beneficial to integrate the interface system 220 onto the same IC as the secure element 208. FIG. 4 depicts an embodiment of an interface system 420 integrated with a secure element 408 onto a secure element IC 480. The secure element IC is connected to an NFC controller IC 482 that includes an NFC controller 400. In the embodiment of FIG. 4, the NFC controller 400, the interface system 420, and the secure element 408 are the same or similar to the corresponding components as described above in FIGS. 2 and 3. In the embodiment of FIG. 4, the bus that connects the interface system to the secure element is referred to as an "internal" bus because the interface system, the secure element, and the bus are integrated onto the same IC (e.g., onto the same silicon substrate) and the bus that connects the interface system to the NFC controller is referred to as an "external" bus because the interface system and the NFC controller are on separate ICs. The internal bus (Data_SE, Address_SE, and Control_SE) may be implemented as conductive traces in the silicon substrate and the bus interfaces (DBI, ABI, and CBI) may be implemented as circuit elements including, for example, converters, comparators, flip-flops, inverters, multiplexers, switches, latches, and/or registers that capture and manage the signals on the bus lines. The external bus (Data_NFCC, Address_NFCC, and Control_NFCC) may be implemented as conductive traces in a printed circuit board (PCB) on which the NFC IC and the secure element IC are mounted and the bus interfaces (DBI, ABI, and CBI) may include external conductive connections (e.g., conductive pads or landings on the IC) that enable conductive connections to the respective buses. In general, operation of the interface system shown in FIG. 4 is similar to the interface system described above with reference to FIGS. 2 and 3.

Figure 5:
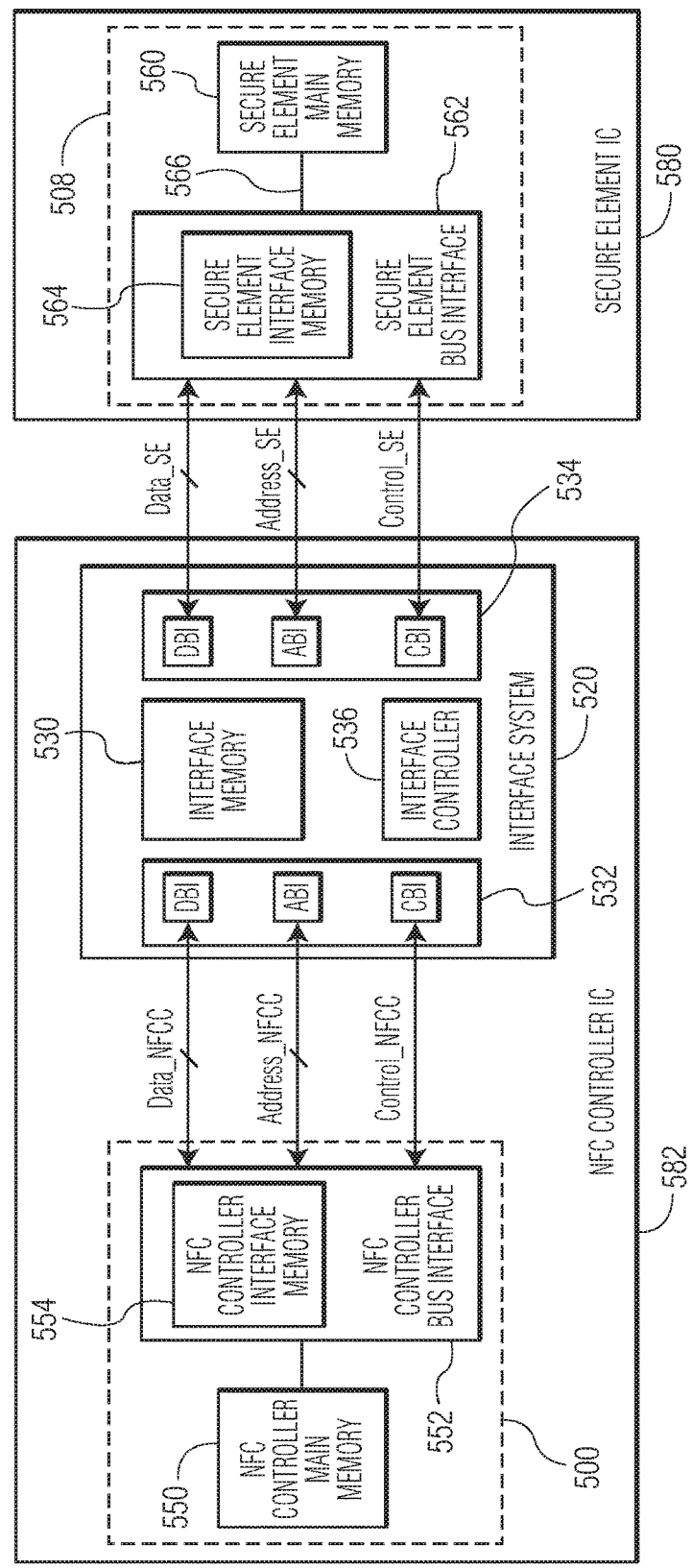
FIG. 5 depicts an embodiment of an interface system that is integrated with an NFC controller onto an NFC controller IC.

FIG. 5 depicts an embodiment of an interface system 520 integrated with an NFC controller 800 onto an NFC controller IC 582. The NFC controller IC is connected to a secure element IC 580 that includes a secure element 508. In the embodiment of FIG. 5, the NFC controller 500, the interface system 520, and the secure element 508 are the same or similar to the corresponding components as described above in FIGS. 2 and 3. In the embodiment of FIG. 5, the bus that connects the interface system to the NFC controller is an "internal" bus and the bus that connects the interface system to the secure element is an "external" bus. The internal bus (Data_NFCC, Address_NFCC, and Control_NFCC) may be implemented as conductive traces in the silicon substrate and the bus interfaces (DBI, ABI, and CBI) may be implemented as circuit elements including, for example, converters, comparators, flip-flops, inverters, multiplexers, switches, latches, and/or registers that capture and manage the signals on the bus lines. The external bus (Data_SE, Address_SE, and Control_SE) may be implemented as conductive traces in a PCB on which the NFC IC and the secure element IC are mounted and the bus interfaces (DBI, ABI, and CBI) may include external conductive connections (e.g., conductive pads or landings on the IC) that enable conductive connections to the respective buses. In general, operation of the interface system shown in FIG. 5 is similar to the interface system described above with reference to FIGS. 2 and 3.

Figure 6:
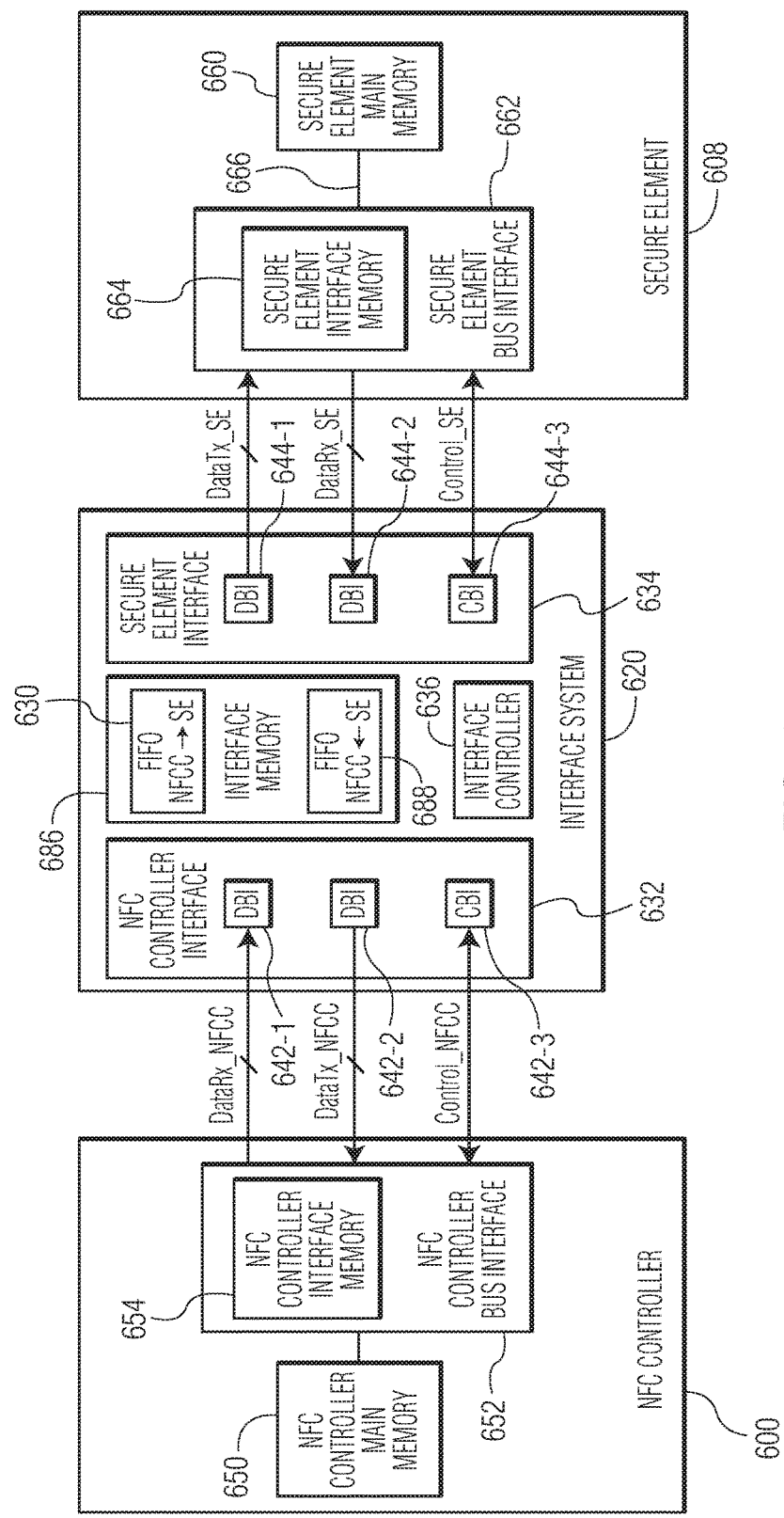
FIG. 6 depicts an embodiment of an interface system in which the interface memory is implemented using FIFO memory.

In an embodiment, the interface memory of the interface system is implemented using FIFO memory. Because a FIFO memory is organized as a queue, using a FIFO memory in the interface system can eliminate the need to track the addresses used for storing and reading data words. FIG. 6 depicts an embodiment of an interface system 620 in which the interface memory 630 is implemented using FIFO memory. In the embodiment of FIG. 6, the interface memory includes a first FIFO memory 686 that is used to communicate data from the NFC controller 600 to the secure element 608 (NFCC→SE) and a second FIFO memory 688 that is used to communicate data from the secure element 608 to the NFC controller 600 (NFCC←SE). In order to support the first and second FIFOs, the NFC controller interface of the interface system includes a data bus interface (DBI) 642-1 that is connected to a data bus, DataRx_NFCC, for data that is received at the interface system from the NFC controller and a data bus interface (DBI) 642-1 that is connected to a data bus, DataTx_NFCC, for data that is transmitted from the interface system to the NFC controller and the secure element interface of the interface system includes a data bus interface (DBI) 644-1 that is connected to a data bus, DataTx_SE, for data that is transmitted from the interface system to the secure element and a data bus interface (DBI) 644-1 that is connected to a data bus, DataRx_SE, for data that is received at the interface system from the secure element. The interface system may also include a control bus interface (CBI) 642-3 on the NFC controller side that is connected to a control bus, Control_NFCC, and a control bus interface (CBI) 644-3 on the secure element side that is connected to a control bus, Control_SE. In an embodiment, the bit width of the DataTx and DataRx buses may be, for example, 8-bits, 16-bits, or 32-bits, depending on factors such as the bit width of available memory Intellectual Property (IP) modules, NFCC data bus width, and/or SE data bus width. In another embodiment, the interface system may include dedicated bus interfaces for input and output data but without utilizing FIFO memory, e.g., utilizing shared memory instead of FIFO memory.

Figure 7:
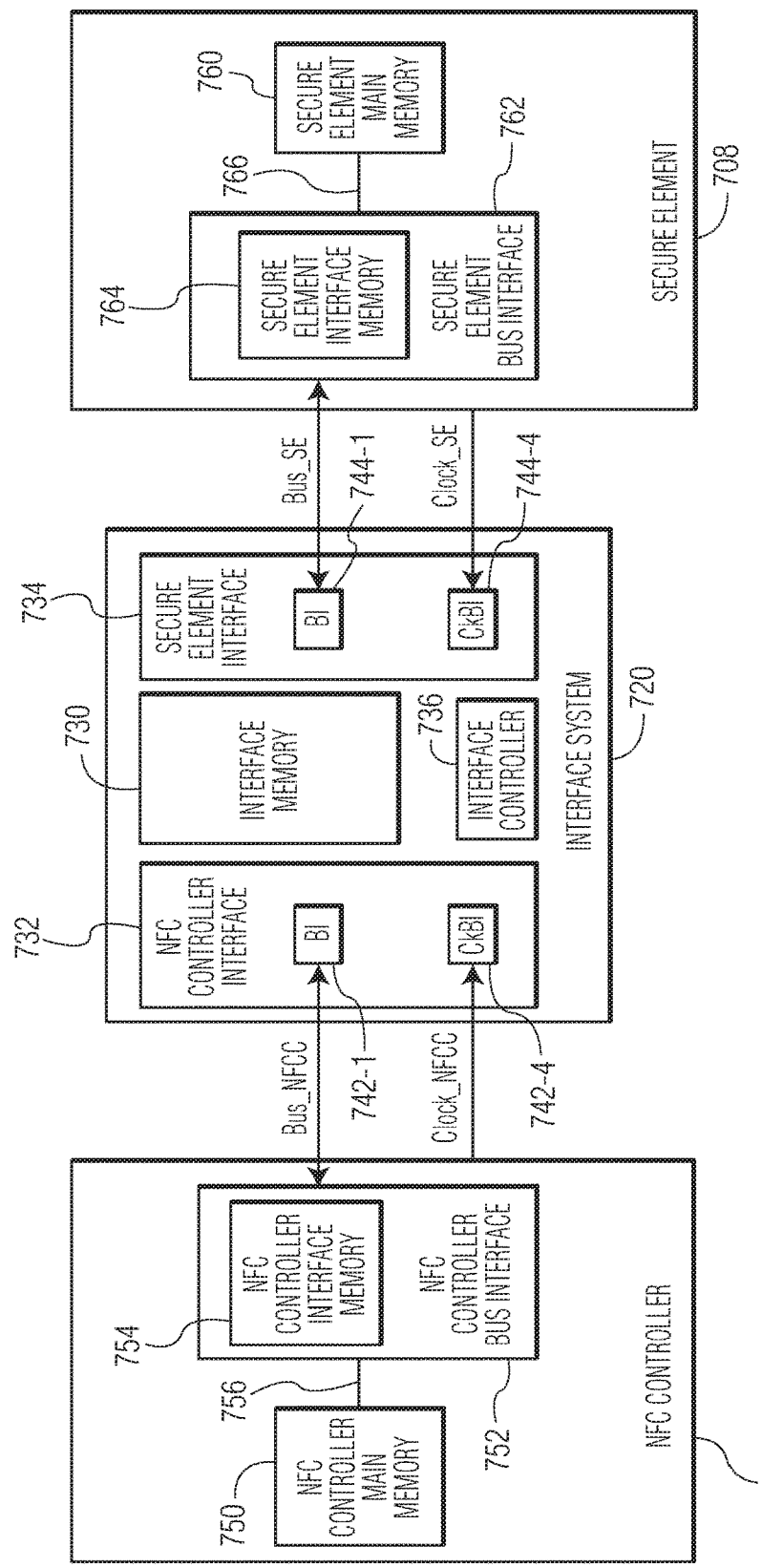
FIG. 7 depicts an embodiment of an interface system that is configured to receive clock information from the NFC controller and from the secure element.

In an embodiment, it may be desirable for the interface system to utilize clock information from the NFC controller and/or from the secure element. For example, it may be desirable to access the interface system on the clock of the NFC controller or the clock of the secure element. It may also be desirable to provide synchronization between different clock domains, e.g., between the clock domain of the NFC controller and the clock domain of the secure element. FIG. 7 depicts an embodiment of an interface system 720 similar to the interface system 220 of FIG. 2 that is configured to receive clock information from the NFC controller 700 and from the secure element 708. In the embodiment of FIG. 7, the NFC controller interface 732 includes a clock bus interface (CkBI) 742-4 to receive clock information from the NFC controller 700 on a clock bus, Clock_NFCC, and the secure element interface 734 includes a clock bus interface (CkBI) 744-4 to receive clock information from the secure element 708 on a clock bus, Clock_SE. Although the interface system shown in FIG. 7 is configured to receive clock information from both the NFC controller and the secure element, the interface system can be configured to receive clock information from either the NFC controller or the secure element.

Figure 8:
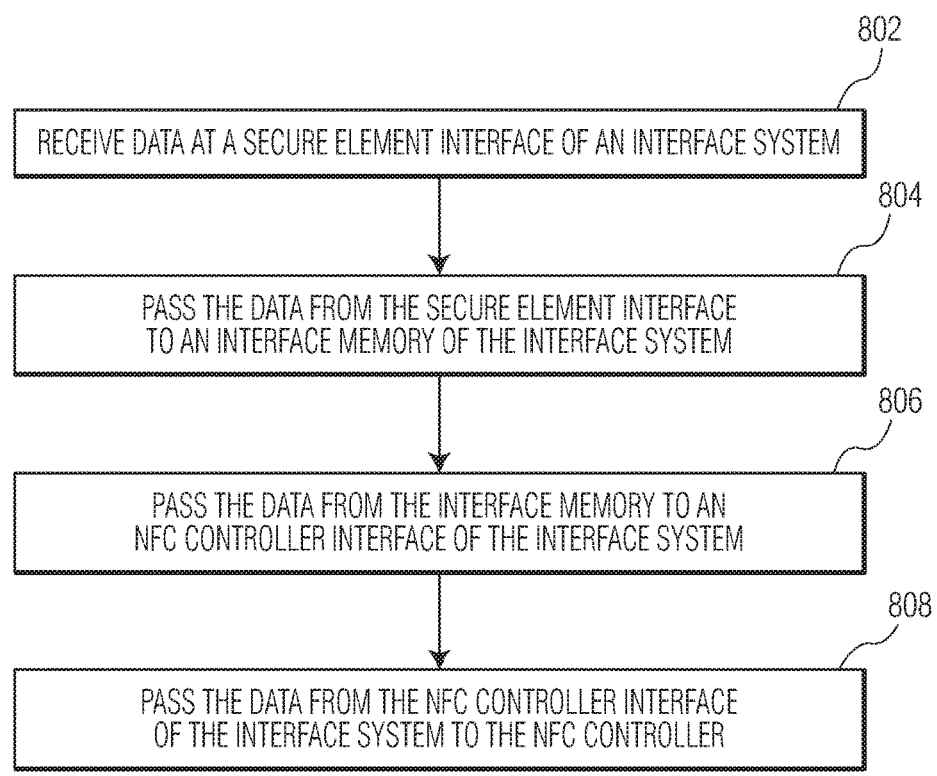
FIG. 8 is a process flow diagram of a method for interfacing an NFC controller to a secure element in accordance with an embodiment of the invention.

In an embodiment, data can be communicated between an NFC controller and a secure element using an interface system as described with reference to FIGS. 2-7. In an embodiment, a method for communicating data between an NFC controller and a secure element, for example, from the secure element to the NFC controller involves receiving data at a secure element interface of an interface system, passing the data from the secure element interface to an interface memory of the interface system, passing the data from the interface memory to an NFC controller interface of the interface system, and then passing the data from the NFC controller interface of the interface system to the NFC controller. FIG. 8 is a process flow diagram of a method for interfacing an NFC controller to a secure element in accordance with an embodiment of the invention. At block 802, data is received at a secure element interface of an interface system. At block 804, the data is passed from the secure element interface to an interface memory of the interface system. At block 806, the data is passed from the interface memory to an NFC controller interface of the interface system. At block 808, the data is passed from the NFC controller interface of the interface system to the NFC controller. In an embodiment, the data can be buffered in the interface memory to implement various traffic management techniques. For example, the data can be subjected to a priority scheme such as a round-robin or weighted round-robin scheme while buffered in the interface memory. In another example, data can be pipelined to speed up the data transfer rate, e.g., for long data transfer sequences. In another embodiment, data can be sorted into multiple logical data channels within the interface memory, which enables traffic isolation, fine granular traffic management, and/or traffic prioritization.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. An interface system for interfacing between an NFC controller and a secure element, the interface system comprising:
    an interface memory;
    an interface controller;
    an NFC controller interface configured to exchange data between the NFC controller interface of the interface system and an NFC controller bus interface included in the NFC controller; and
    a secure element interface configured to exchange data between the secure element interface of the interface system and a secure element bus interface included in the secure element.

2. The interface system of claim 1, wherein the NFC controller interface includes a parallel bus interface and the secure element interface includes a parallel bus interface.

3. The interface system of claim 2, wherein the parallel bus interface of the NFC controller interface is at least 8-bits wide and wherein the parallel bus of the secure element interface is at least 8-bits wide.

4. The interface system of claim 1, wherein the interface memory is a shared memory.

5. The interface system of claim 1 wherein the interface memory is a first-in first-out (FIFO) memory.

6. The interface system of claim 1, wherein the interface memory is a random access memory (RAM) with buffer handling.

7. The interface system of claim 1, wherein the interface memory is a random access memory (RAM) that includes multiple buffers.

8. The interface system of claim 7, wherein the interface controller is a configured to implement traffic prioritization.

9. The interface system of claim 7, wherein the interface controller is a configured to implement traffic pipelining.

10. The interface system of claim 7, wherein the interface controller is a configured to implement multiple logical data channels.

11. A secure element integrated circuit (IC) that includes the interface system of claim 1.

12. A near field communications (NFC) controller integrated circuit (IC) that includes the interface system of claim 1.

13. An interface system for interfacing between an NFC controller and a secure element, the interface system comprising:
an interface memory;
an interface controller;
an NFC controller interface configured to exchange data between the NFC controller interface of the interface system and an NFC controller bus interface included in the NFC controller and comprising a data bus interface, an address bus interface, and control bus interface, wherein the data bus interface is a parallel interface; and
a secure element interface configured to exchange data between the secure element interface of the interface system and a secure element bus interface included in the secure element and comprising a data bus interface, an address bus interface, and control bus interface, wherein the secure element data interface is a parallel interface.

14. The interface system of claim 13, wherein the data bus interface of the NFC controller interface is at least 8-bits wide and wherein the data bus of the secure element interface is at least 8-bits wide.

15. The interface system of claim 13, wherein the interface memory is a shared memory.

16. The interface system of claim 13, wherein the interface memory is a first-in first-out (FIFO) memory.

17. The interface system of claim 13, wherein the interface memory is a random access memory (RAM) with buffer handling.

18. The interface system of claim 13, wherein the interface memory is a random access memory (RAM) that includes multiple buffers.

19. An method for communicating data between an NFC controller and a secure element, the method comprising:
receiving data at a secure element interface of an interface system from a secure element bus interface included in the secure element;
passing the data from the secure element interface to an interface memory of the interface system;
passing the data from the interface memory to an NFC controller interface of the interface system; and
passing the data from the NFC controller interface of the interface system to an NFC controller bus interface included in the NFC controller.

20. The method of claim 19 wherein:
receiving data at a secure element interface of an interface system from a secure element bus interface included in the secure element comprising receiving the data from a parallel bus that is connected to the secure element bus interface included in the secure element; and
passing the data from the NFC controller interface of the interface system to an NFC controller bus interface included in the NFC controller comprises passing the data to a parallel bus that is connected to the NFC controller bus interface included in the NFC controller.

* * * * *